Figure 1:
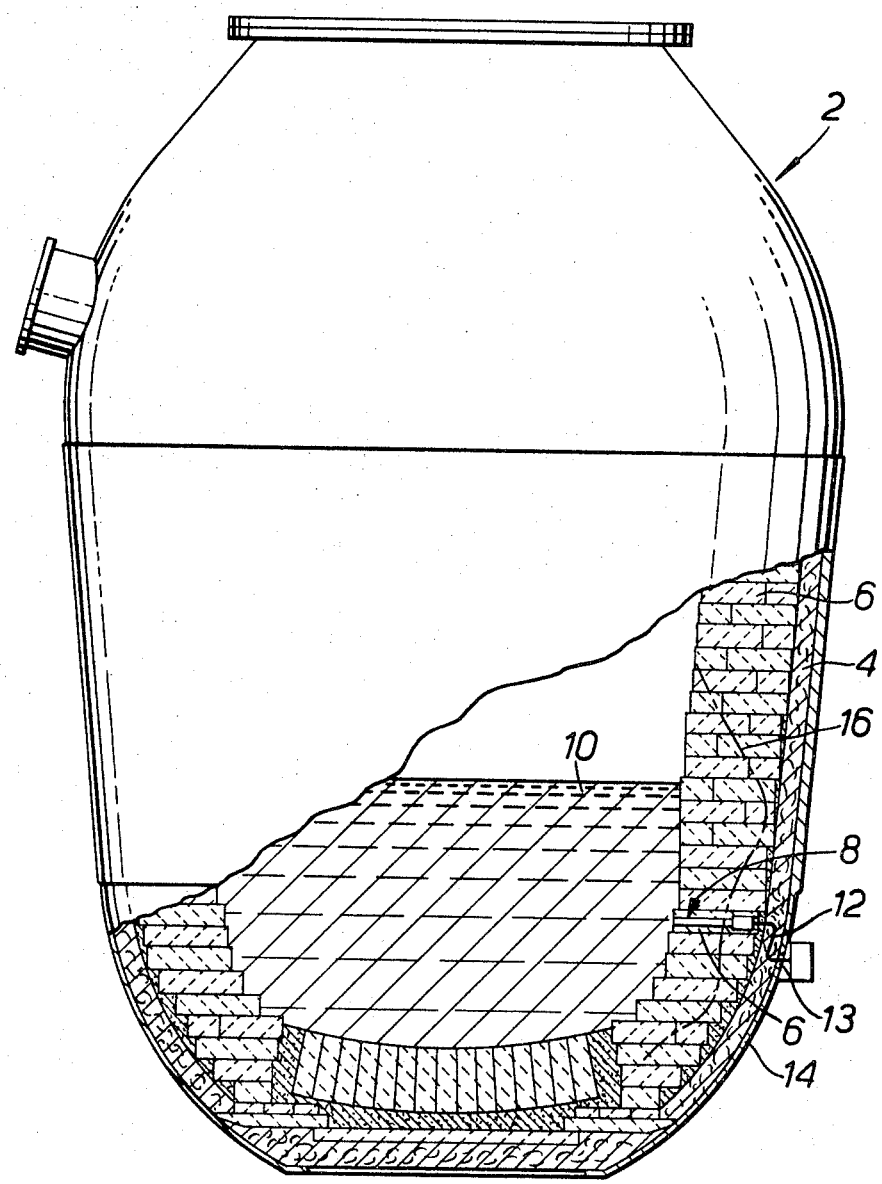

United States Patent [19]
Veltze et al.

[11] 3,745,834
[45] July 17, 1973

[54] DEVICE FOR MEASURING TEMPERATURE OF MOLTEN METAL

[75] Inventors: Stanislaw Marian Veltze, London S.W. 7; Paul Everitt English, Horsham, both of England

[73] Assignee: The British Iron and Steel Research Association, London, England

[22] Filed: Jan. 19, 1972

[21] Appl. No.: 219,109

[30] Foreign Application Priority Data
Feb. 5, 1971  Great Britain...................... 4,036/71

[52] U.S. Cl................ 73/343 R, 73/355 R, 356/44
[51] Int. Cl............................. G01j 5/08, G01k 1/16
[58] Field of Search................. 73/355 R, 355 EM, 73/343 R, 343 B; 356/44, 45

[56] References Cited
UNITED STATES PATENTS

| | | |
|---|---|---|
| 3,570,277 | 3/1971 | Dorr et al. ....................... 73/355 R |
| 3,051,035 | 8/1962 | Root .............................. 73/355 R X |
| 3,626,758 | 12/1971 | Stewart et al. ..................... 73/355 R |
| 2,709,367 | 5/1955 | Bohnet............................. 73/355 R |

*Primary Examiner*—Jerry W. Myracle
*Assistant Examiner*—Frederick Shoon
*Attorney*—Bacon & Thomas

[57] ABSTRACT

A device for measuring the temperature of molten steel extends through the wall of the steelmaking vessel. The device consists of a number of sapphire rods each in its own refractory tubes, and all within an outer refractory tube. The rods are formed of rod lengths offset with respect to the rod lengths of adjacent rods. Radiation from the molten steel is transmitted through the rods and displaced by a lens to a flexible radiation guide extending outside the vessel. Even if one of the rods cracks in use a useful temperature measurement can still be obtained by analysing the radiation in a ratio pyrometer.

9 Claims, 5 Drawing Figures

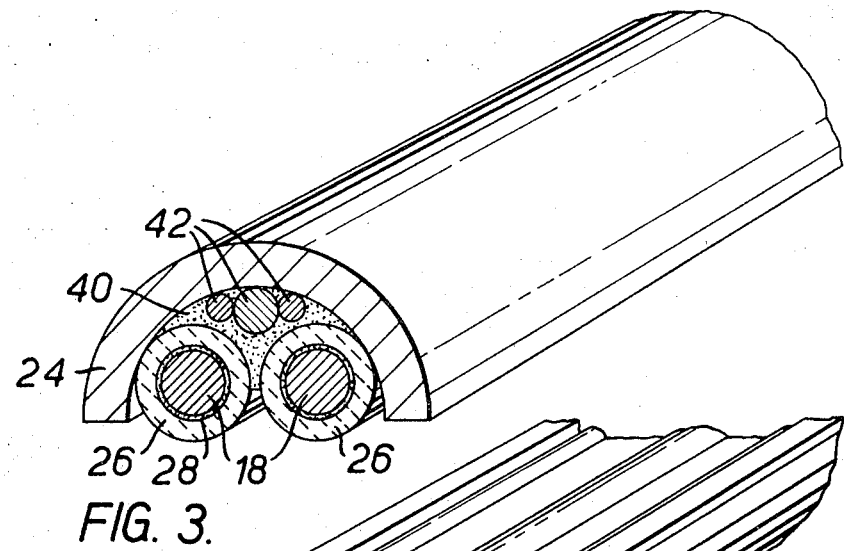
FIG. 3.
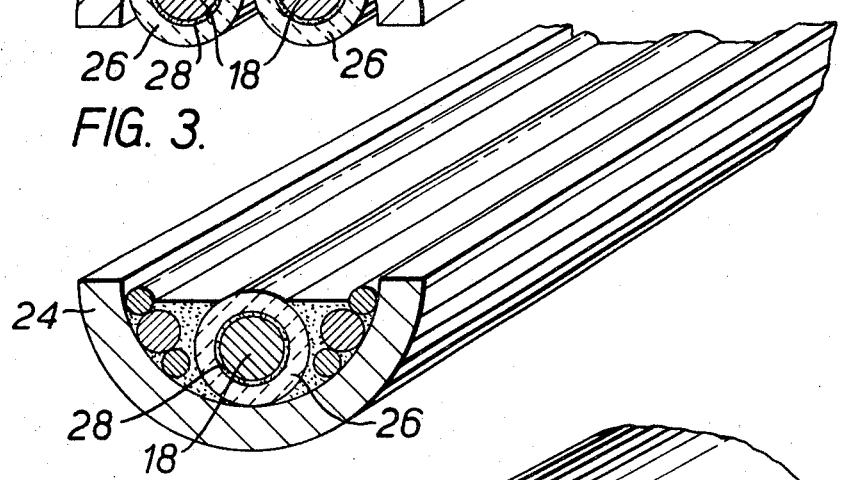
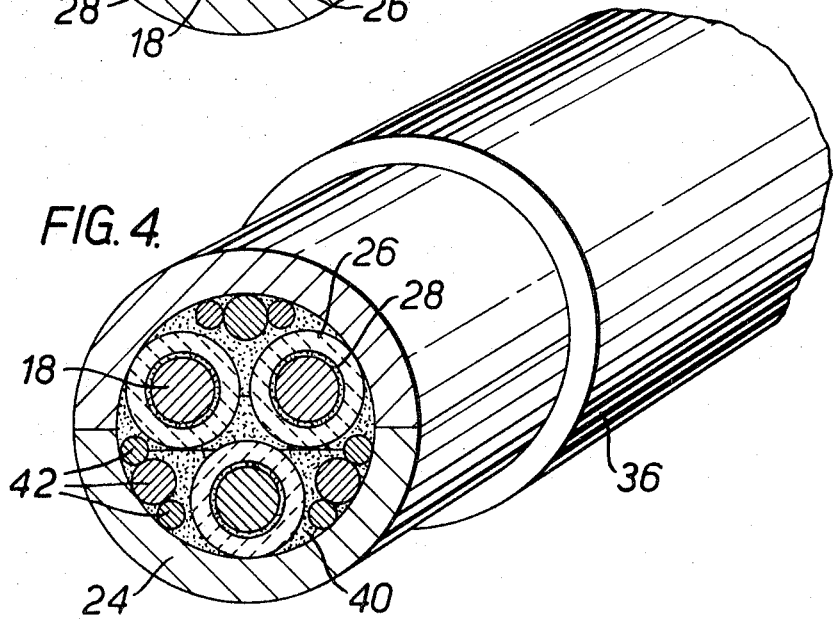
FIG. 4.

DEVICE FOR MEASURING TEMPERATURE OF MOLTEN METAL

The measurement of temperature of molten metal in a steelmaking converter is conventionally carried out intermittently. It is desirable to be able to measure the temperature continuously and proposals have already been made to have a light transmitting member extending through the wall of the steelmaking vessel and to determine the temperature by analysing the light using a ratio pyrometer.

According to the present invention a device for measuring the temperature of molten metal in a vessel is characterised by a plurality of generally parallel radiation permeable rods resistant to high temperature set in a refractory material so that the faces at one end of the rods are exposed in use to molten metal.

In use the device can be mounted in the wall of a steelmaking vessel extending through the refractory lining. The lining is subject to stresses which may result in shearing forces or bending moments being applied to the rods. If one of the rods cracks its ability to transmit radiation is diminished but we have found that it is the quality of the radiation transmitted to the ratio pyrometer rather than the quantity which is important and the provision of more than one rod ensures that error in the measured temperature is minimised. By having more than one rod the reliability of the device is thus considerably improved. Preferably there are at least three rods.

A ratio pyrometer works on the principle that the ratio of the energy emitted by a hot body at two or more distinct wave lengths or over two or more different wavebands can be uniquely related to the temperature of the body. Provided the emissivity of the surface of the hot body is the same at the two wave lengths, then the measured temperature is independent of emissivity. Similarly if the radiation being transmitted to a pyrometer is attenuated by some interference then, providing the attenuation does not alter with wave length, the measured temperature will not be affected.

Preferably the end faces of the rods opposite the ends exposed to the molten metal are disposed adjacent to a radiation transmitting element for displacing radiation emerging from any of the rods towards a single radiation exit. A flexible radiation guide can be connected to the exit to guide radiation to a pyrometer. The radiation transmitting element could have a conical surface with a truncated apex towards the exit but is preferably a lens.

In order to diminish the likelihood of the rods cracking each rod preferably consists of a plurality of lengths butted together. It has been found that even if shear stresses are applied to the device so that adjacent rod lengths are slightly misaligned the ability of the device to measure temperature is not greatly altered. Preferably the rod lengths of one rod are offset with respect to the rod lengths of another rod so that as the rods are worn away in use the ends of rod length on different rods are not exposed to hot metal simultaneously.

Each rod can be fitted into a refractory tube, each tube being made up of a number of tube lengths butted together, there being one tube length for each rod length, and each rod length being slightly offset with respect to its associated tube length so that a projecting rod length forms a spigot to be received in a socket formed by the adjacent tube length. The rod lengths are preferably a close fit in their associated tube lengths.

The rods are preferably sapphire rods and may have highly reflective surfaces for example by coating them with a metallic coating e.g. platinum. This minimises loss of radiation through the walls of the rod. The temperature of the face in contact with molten metal will be approximately between 1570° to 1630°C. Sapphire is a suitable material for temperatures in excess of 900°C. Fused quartz can be used for temperatures between 900°C and 200°C. Yttrium oxide or magnesium oxide are also possibly suitable materials.

All the rods are preferably contained within a refractory outer tube.

The radiation transmitting element, for example a lens, is preferably made of quartz although it could be of sapphire. Quartz deteriorates at high temperatures and therefore the element could be mounted in a housing with passages for cooling fluid.

The device could be mounted on a lance to be inserted into a vessel instead of being mounted in the wall of the vessel.

Figure 2:
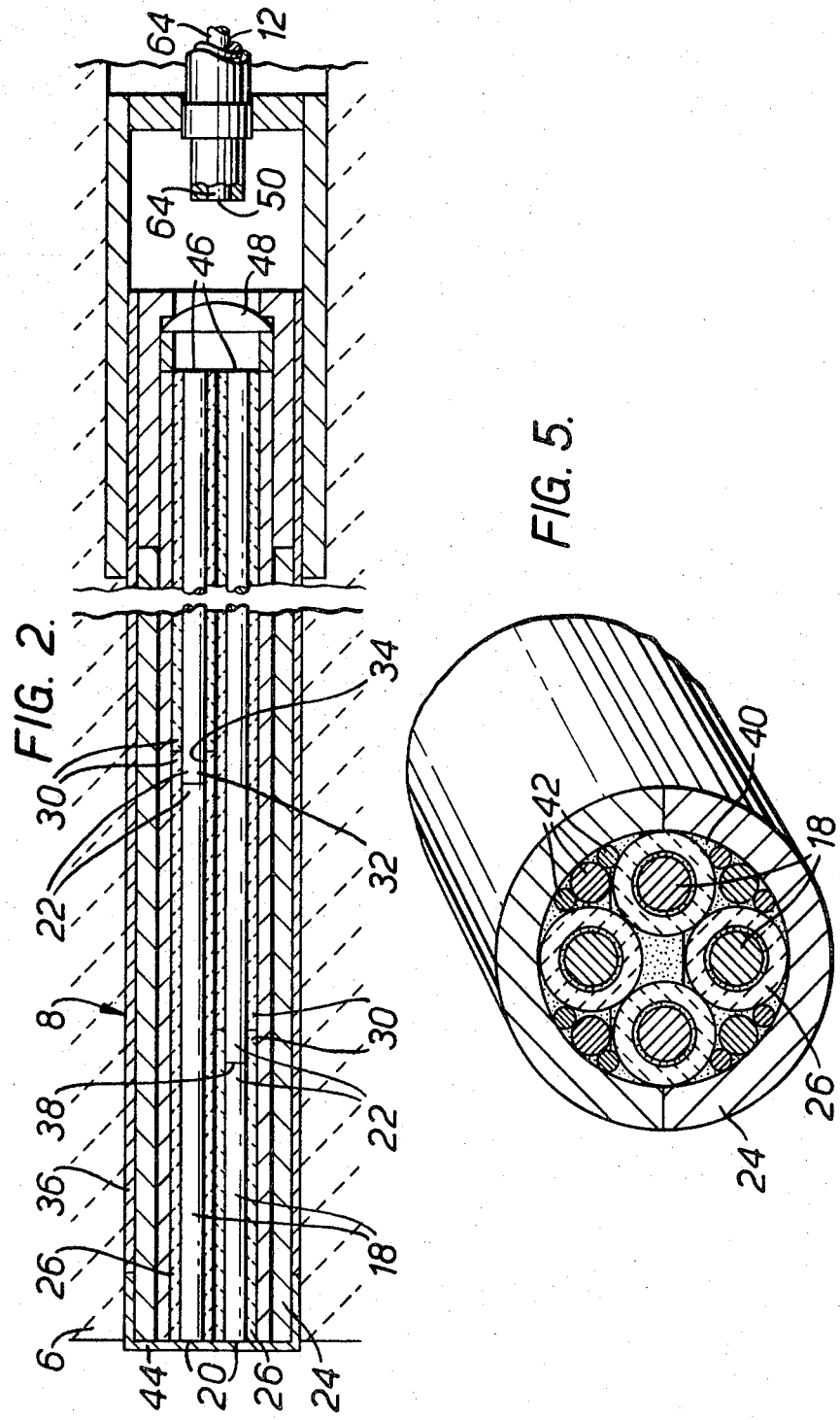

In the accompanying drawings:

FIG. 1 shows a steelmaking vessel partly cut away with a device according to the invention mounted in the wall, FIG. 2 is a cross section through one embodiment of a device according to the invention, FIGS. 3 and 4 are perspective views showing how the device is assembled, and FIG. 5 shows a perspective view of part of another embodiment.

A basic oxygen steelmaking converter 2 is lined with a permanent lining of refractory material 4 and a working lining of refractory bricks 6 in the usual way. A device 8 for measuring temperature of molten metal 10 in the vessel 2 is mounted in the wall of the vessel 2 and extends through one of the bricks 6 which is formed with a central hole. A flexible radiation guide 12 is connected to the device 8 and passes through a hole 13 in the outer shell 14 of the vessel 2. The hole 13 is displaced from alignment with device 8 to minimise any risk of molten metal leaking past the device 8. During the campaign the working lining 6 wears, usually to a configuration indicated by chain dash line 16, and the device 8 is disposed in a region where the wear is consistent and where material does not build up to block the end of the device.

FIG. 2 shows that the device 8 includes a plurality of generally parallel radiation permeable rods 18 set in refractory material so that the faces 20 at one end of the rods 18 are exposed in use to molten metal. The rods 18 are sapphire rods, and each consists of a plurality of rod lengths 22 butted together. FIGS. 3 and 4 show that there are three rods 18 and the rod lengths 22 are arranged so that the rod lengths 22 of one rod 18 are offset with respect to the rod lengths of the other rods. The rods 18 are contained within a refractory outer tube 24 formed in two parts for ease of assembly. The tube 24 is made of recrystallised alumina.

Each rod 18 is fitted and secured with pure alumina cement 28 into its own refractory tube 26 although the rods 18 may be a close fit in the refractory tubes 26 without the need for cement. Each tube 26 is formed of a number of lengths 30 of recrystallised alumina butted together, there being one tube length 30 for each rod length 22. FIG. 2 shows that each rod length 22 is slightly offset with respect to its associated tube lengths 30, so that projecting rod lengths 22 form a spigot 32 to be received in a socket 34 formed by the adjacent tube length 30. The rod lengths 22 have highly polished end surfaces 38.

The rods 18 and tubes 26 are packed in the outer refractory tube 24 in alumina cement 40. Recrystallised alumina rods 42 are used to fill excess space inside the outer tube 24.

A protective metal sheath 36 surrounds the outer refractory tube 24 and eliminates any possible ingression of tar materials from the refractory bricks 6.

A protective metal cover 44 is positioned over the end of the outer tube 24 to protect the device 8 when it is being installed in the wall of the vessel 2. The cover 44 melts as soon as the vessel is in use.

The faces 46 of the rods 18 opposite the faces 20 are disposed adjacent to a radiation transmitting element 48 which displaces radiation emerging from any of the rods 18 towards a single radiation exit 50. The faces 46 are highly polished. The element 48 is a quartz lens having highly polished surfaces.

The spacing between the lens 48 at the exit 50 is equal to the focal length of the lens 48. The exit 50 is constituted by the end of a flexible radiation guide 12. The guide 12 is of a known kind having a light transmitting fibre interior 64.

FIG. 5 shows another embodiment which is similar to the embodiment shown in FIGS. 2 to 4 except that there are four rods 18.

In use a ratio pyrometer is connected to the guide 12. Radiation from the molten metal passes through the rods 18, is displaced by the lens 48 and passes into the light transmitting fibre 64. The lens 48 serves to deflect light from any of the rods 18 to the guide 12. The temperature of the metal can be measured by analysing the radiation with the ratio pyrometer. As the working lining of the vessel wears the device will wear away also, but one device can survive throughout a campaign.

It is possible for a slight bending moment applied to the device to be accommodated by the spigot and socket connections between rod and tube lengths without cracking the rods. A slight inclination between ajdacent rod lengths 22 will not seriously diminish the quantity of radiation because the outer surfaces of the rods are reflective.

If a bending moment or a shear force applied to the device 8 results in one rod cracking, the device will still operate.

The extent to which a crack can alter the quality of the radiation and hence the measured temperature depends on the amount of radiation from the molten metal which is dissipated by the crack and the radiation from the crack itself. If the crack is in a cool region it will attenuate the radiation but will not substantially change the wave length. If the crack is in a hot region it will act both as an attenuator and as a radiating source. If the radiating crack is at the same temperature as the exposed face of the rod it has no effect on the wave length, but if it is hot but at a lower temperature than the exposed face it will reduce the radiation being transmitted and will radiate itself at a different temperature. The error introduced by a cracked rod is therefore a minimum when either the crack is at the temperature of the molten metal or when the crack is at a low temperature, and is a maximum somewhere in between. We have calculated that with the exposed rod face at a temperature of 1600°C and with a crack in the rod which completely dissipates the energy incident on it from the exposed face, and which radiates with an emissivity of one, the maximum error occurs at a crack temperature in the range 1400°C to 1500°C. When there are two rods, one of which is cracked, the maximum error in the measured reading is then approximately 30°C. Where there are three rods, one of which is cracked, the maximum error is approximately 13°C. Where there are four rods, one of which is cracked, the maximum error is approximately 8°C. If there had only been a single rod the measured temperature will always be equal to the temperature of the crack.

The invention thus provides a device for continuously measuring the temperature in a steelmaking vessel which is able to provide a useful temperature measurement despite partial damage resulting from the forces that are bound to be experienced in use.

We claim:

1. In a device for measuring the temperature of molten metal in a vessel including means for transmitting radiation from said molten metal to means for analyzing said radiation, the improvement wherein said means for transmitting radiation from the molten metal comprise a plurality of generally parallel radiation permeable rods resistant to high temperature set in a refractory material so that the faces at one end of the rods are exposed in use to molten metal, each said rod consisting of a plurality of rod lengths butted together.

2. A device as claimed in claim 1 in which the rod lengths of one rod are offset with respect to the rod lengths of another rod.

3. A device as claimed in claim 2 in which each rod is fitted into a refractory tube, each tube being made up of a number of tube lengths butted together, there being one tube length for each rod length, and each rod length being slightly offset with respect to its associated tube length so that a projecting rod length forms a spigot to be received in a socket formed by the adjacent tube length.

4. A device as claimed in claim 1 in which all the rods are contained within a refractory outer tube surrounded by a protective metal sheath.

5. A device as claimed in claim 1 in which there are at least three rods.

6. A device as claimed in claim 1 in which the rods are sapphire rods.

7. A device as claimed in claim 1 in which the faces of the rods remote from the exposed faces are disposed adjacent to a radiation transmitting element for displacing radiation emerging from any of the rods towards a single radiation exit.

8. A device as claimed in claim 1 in which the faces of the rods remote from the exposed faces are disposed adjacent to a radiation transmitting element for displacing radiation emerging from any of the rods to a single radiation exit, said exit being constituted by the end of a flexible radiation guide.

9. A device as claimed in claim 1 extending through a brick of refractory material.

* * * * *